Patented July 5, 1932

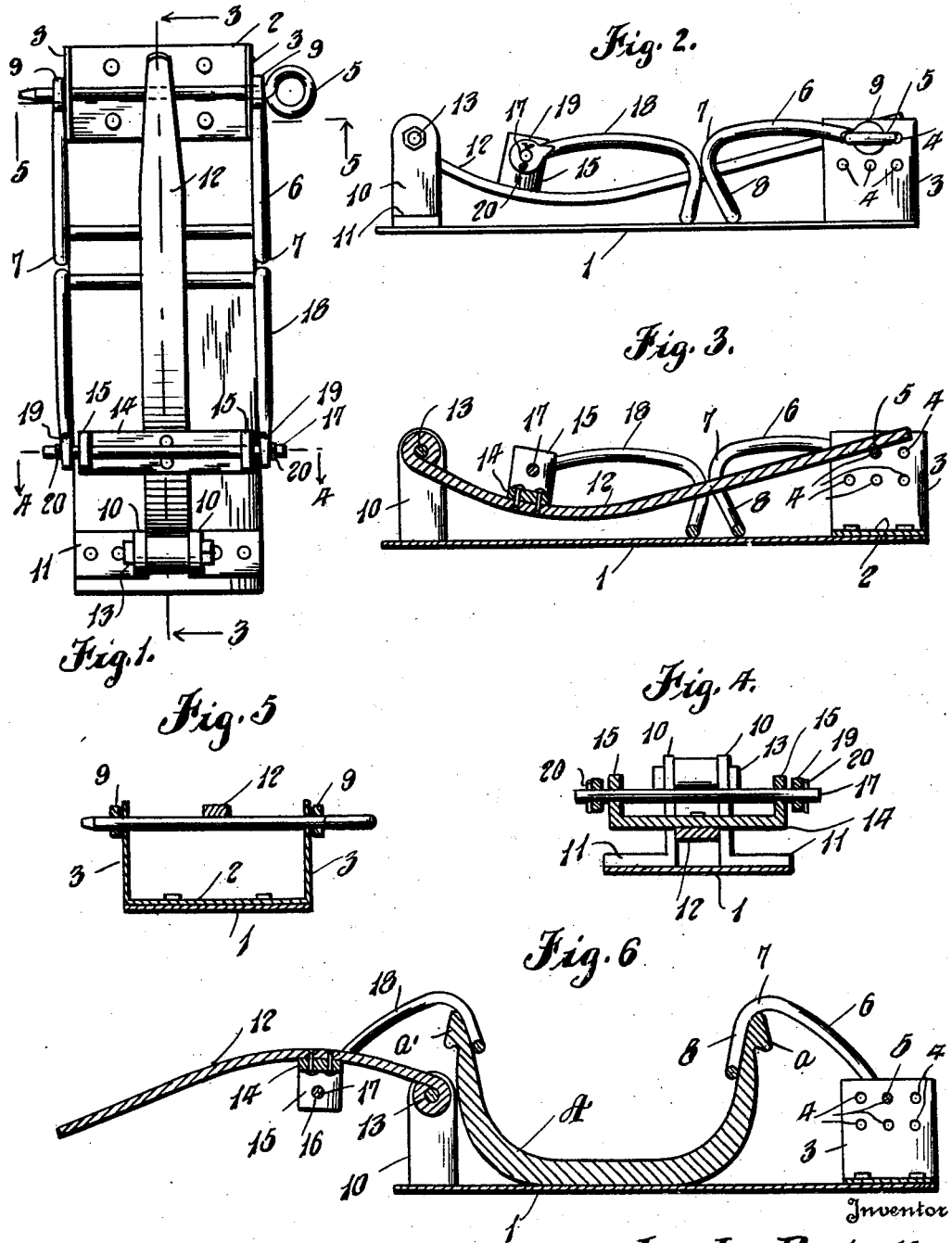

1,866,518

UNITED STATES PATENT OFFICE

JAMES L. PESHETTE, OF PERU, NEW YORK

TIRE SPREADING MACHINE

Application filed September 5, 1929. Serial No. 390,561.

This invention relates to machines for spreading the casings of pneumatic tires for inspection preliminary to repair and replacement of the inner tube therein, and has for its object the provision of a machine of the character stated having a base member to support a casing for inspection and including hook members to engage the beads of the tire, one of said hook members being pivotally mounted on a pivoted arm for spreading the casing to expose its interior.

A further object of the invention is the provision of means for adjusting one of the hooks, above referred to, to adjust the mechanism for use of various sized tire casings.

The invention will be described hereinafter and will be found illustrated in the accompanying drawing, in which Figure 1 is a top plan view of the improved tire spreading machine, Figure 2 is a side view in elevation, Figure 3 is a longitudinal sectional view on a plane indicated by the line 3—3 of Figure 1, Figures 4 and 5 are transverse sectional views on planes indicated by the lines 4—4 and 5—5, respectively, and Figure 6 is a view similar to Figure 3 showing the machine in position spreading a tire casing illustrated in transverse section.

Referring to the drawing in which similar reference characters designate corresponding parts in the several views, the improved machine comprises a base plate 1 that is adapted to support a tire casing A, as shown in Figure 6. Secured to base plate 1 is a plate 2 having its ends formed perpendicularly to base member 1 and providing spaced ears 3 having a plurality of alined openings 4 therein to receive a pivot pin 5. 6 indicates an angular hook member formed of a metal, preferably steel, rod first bent into a U-shape and its sides bent as shown at 7 to provide a hook end 8 to engage one of the beads $a$ of the casing A, the terminals of the rod at the extremities of the U-shape having loops 9 thereon through which the pivot pin 5 is inserted to secure the hook member 6 in pivoted relation with the ears 3 and the base member 1. 10 indicates other spaced ears having angularly related feet 11 that are secured to the base plate 1. Between the ears 10 a lever arm 12 is pivotally mounted on a pivot pin 13, and secured to said arm 12 is a plate 14 having its ends 15 perpendicularly related to the intermediate portion of the plate and providing spaced ears having alined openings 16 to receive a pivot pin 17 to pivotally support a hook member 18 similar in construction to hook member 6, including loops 19 to engage the pivot pin 17, 20 indicating pins secured through transverse openings in the pin 17 to hold the loops 19 on the pin. The hook 18 is provided to engage the bead $a'$ of the casing A and by turning the arm 12 on pivot pin 13 the casing will be opened, as shown in Figure 6, for inspection.

By providing a plurality of alined openings 4 for the pivot pin 5 it will be apparent that the hook 6 may be adjusted so that the machine may operate on casings of varying sizes.

Furthermore, as shown in Figures 1, 2 and 3, because of the formation of hook members 6 and 18 of U-shaped rods, the lever 12 is movable within said hook members to provide a compact structure for storage of the machine when not in use.

I claim:—

A tire spreading machine, comprising a base plate adapted to support a tire, ears on said base having a plurality of alined openings, a hook member, means to adjustably pivot said hook member in alined openings in said ears, a lever arm pivotally supported on said base plate, and a hook member pivotally mounted on said lever arm, said hook members being adapted to engage the beads of the tire and to spread it by actuation of said lever arm on its pivot, said hook members being formed from U-shaped members, and the lever being movable within said hook members for storage of the machine.

In testimony whereof I affix my signature.

JAMES L. PESHETTE.